(12) United States Patent
Hauser

(10) Patent No.: US 8,029,265 B2
(45) Date of Patent: Oct. 4, 2011

(54) BURGER PRESS

(75) Inventor: Lawrence M. Hauser, Auburn, WA (US)

(73) Assignee: Progressive International Corporation, Kent, WA (US)

( * ) Notice: Subject to any disclaimer, the term of this patent is extended or adjusted under 35 U.S.C. 154(b) by 112 days.

(21) Appl. No.: 12/408,395

(22) Filed: Mar. 20, 2009

(65) Prior Publication Data

US 2009/0246311 A1    Oct. 1, 2009

Related U.S. Application Data

(63) Continuation-in-part of application No. 29/328,913, filed on Dec. 3, 2008.

(60) Provisional application No. 61/040,381, filed on Mar. 28, 2008, provisional application No. 61/109,449, filed on Oct. 29, 2008.

(51) Int. Cl.
*A23P 1/00* (2006.01)
(52) U.S. Cl. ......... 425/193; 425/340; 425/412; 426/512
(58) Field of Classification Search .................. 425/193, 425/195, 334, 340, 346, 412; 426/512–514
See application file for complete search history.

(56) References Cited

U.S. PATENT DOCUMENTS

| | | | |
|---|---|---|---|
| 1,257,230 A | 2/1918 | Higginbotham | |
| 1,680,816 A | 8/1928 | Spaulding | |
| 1,752,837 A * | 4/1930 | Corns | 425/346 |
| RE24,935 E | 2/1961 | Glenny | |
| D206,606 S | 1/1967 | Brown | |
| 3,609,799 A | 10/1971 | Lee | |
| D245,827 S | 9/1977 | Korpi | |
| 4,057,874 A | 11/1977 | Walker, Jr. | |
| 4,245,373 A | 1/1981 | Coroneos | |
| 4,294,865 A * | 10/1981 | Coroncos | 426/513 |
| 4,803,918 A | 2/1989 | Carbon et al. | |
| 4,967,650 A | 11/1990 | Weigle | |
| D333,759 S | 3/1993 | Ferrin | |
| D352,206 S | 11/1994 | Davis | |
| D353,968 S | 1/1995 | Cock | |
| 5,658,608 A | 8/1997 | Klefbeck | |
| D414,075 S | 9/1999 | Mishan | |
| D575,097 S | 8/2008 | Courington et al. | |
| 2007/0034094 A1* | 2/2007 | Tatham | 99/450.2 |

FOREIGN PATENT DOCUMENTS

WO    2006032473    3/2006

* cited by examiner

*Primary Examiner* — Richard Crispino
*Assistant Examiner* — Thukhanh Nguyen
(74) *Attorney, Agent, or Firm* — Lowe Graham Jones PLLC

(57) ABSTRACT

A burger press includes a base having upward extending sidewalls, a lifter sized and shaped to fit within the base, and a plunger having a handle attached to a first side of a generally planar plate that is sized and shaped to fit within the base. At least one of a second side of the plunger plate and the lifter are shaped to include a surface feature selected from a plurality of ribs and a raised portion, the plurality of ribs and the raised portion being structured to press into a burger as the burger is formed in the burger press by compressing the burger between the plunger and the lifter.

18 Claims, 5 Drawing Sheets

BURGER PRESS

PRIORITY

This application claims priority to U.S. Provisional Application Ser. No. 61/040,381 filed Mar. 28, 2008, U.S. Provisional Application Ser. No. 61/109,449 filed Oct. 29, 2008, and U.S. Design Application Ser. No. 29/328,913 filed Dec. 3, 2008, now Pat. No. D, 595,998, all of which are incorporated herein by reference in their entirety.

BACKGROUND OF THE INVENTION

A burger press is a well known device that is commonly used to form ground beef or other malleable food items into a flat, generally disk-shaped form. Typically a burger press includes a base plate having a cylindrical interior and a circular plunger that is used to press the meat into form.

While existing burger presses are suitable for creating a disk shaped form, that particular shape is not always ideal for cooking.

SUMMARY OF THE INVENTION

In accordance with some examples of the invention, a burger press includes a base having upward extending sidewalls, a lifter sized and shaped to fit within the base, and a plunger having a handle attached to a first side of a generally planar plate that is sized and shaped to fit within the base. At least one of a second side of the plunger plate and the lifter are shaped to include a surface feature selected from a plurality of ribs and a raised portion, the plurality of ribs and the raised portion being structured to press into a burger as the burger is formed in the burger press by compressing the burger between the plunger and the lifter.

In accordance with other examples of the invention, the second side of the plunger plate includes a plurality of linear ribs that extend laterally across the plunger plate.

In accordance with still further examples of the invention, the lifter includes a convex dome-shaped raised central portion.

In accordance with yet other examples of the invention, the lifter includes a circular main lifter body and the dome-shaped central portion is approximately one third of the diameter of the main lifter body.

In accordance with still another example of the invention, the lifter includes a lifter handle.

In accordance with still further examples of the invention, the lifter handle includes a flat upwardly extending arm terminating in a radially projecting tab.

In accordance with yet another example of the invention, the base further includes a peripheral flange and an upper lip extending around a perimeter of the base and upward from the sidewalls. The upper lip defines a channel structured to receive the radially projecting tab of the lifter handle.

In accordance with further examples of the invention, the base defines a recessed region along the sidewalls, the recessed region structured to receive the upwardly extending arm of the lifter handle.

In accordance with still further examples of the invention, a lower surface of the base includes a plurality of feet formed of a non-slipping material that provides frictional resistance to sliding movement when the base is placed on a working surface.

In accordance with additional examples of the invention, the base defines a first recessed portion with upward extending sidewalls and a second recessed portion with upward extending sidewalls, the lifter includes a first lifting plate sized and shaped to fit within the first recessed portion of the base and a second lifting plate sized and shaped to fit within the second recessed portion of the base, and the plunger includes a first generally planar plate sized and shaped to fit within the first recessed portion of the base and a second generally planar plate sized and shaped to fit within the second recessed portion of the base.

In accordance with yet other examples of the invention a burger press includes a base having upward extending sidewalls, a plurality of disks sized and shaped to fit within the base, and a plunger having a handle attached to a first side of a generally planar plate that is sized and shaped to fit within the base. At least one side of each disk is shaped to include a surface feature selected from a plurality of ribs and a raised portion, the plurality of ribs and the raised portion being structured to press into a burger as the burger is formed in the burger press, and wherein the base is sufficiently tall to allow for each disk to be contained within the base plus a number of burgers corresponding to the total number of disks to be contained within the base at the same time.

In accordance with other examples of the invention, the burger press includes a lid configured to fit over a top rim of the base.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
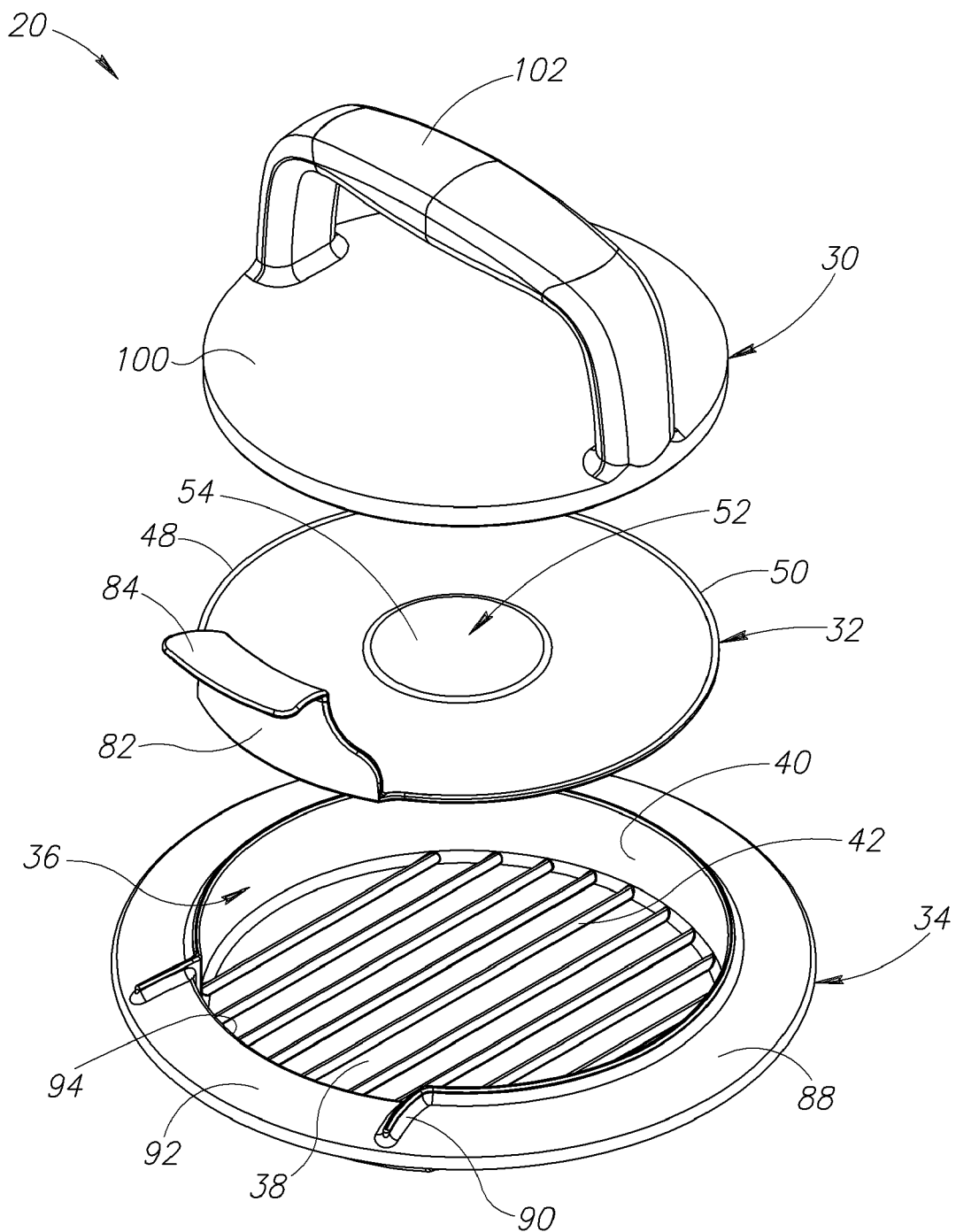
FIG. 1 is a top exploded perspective view of a burger press formed in accordance with an embodiment of the invention.
Figure 2:
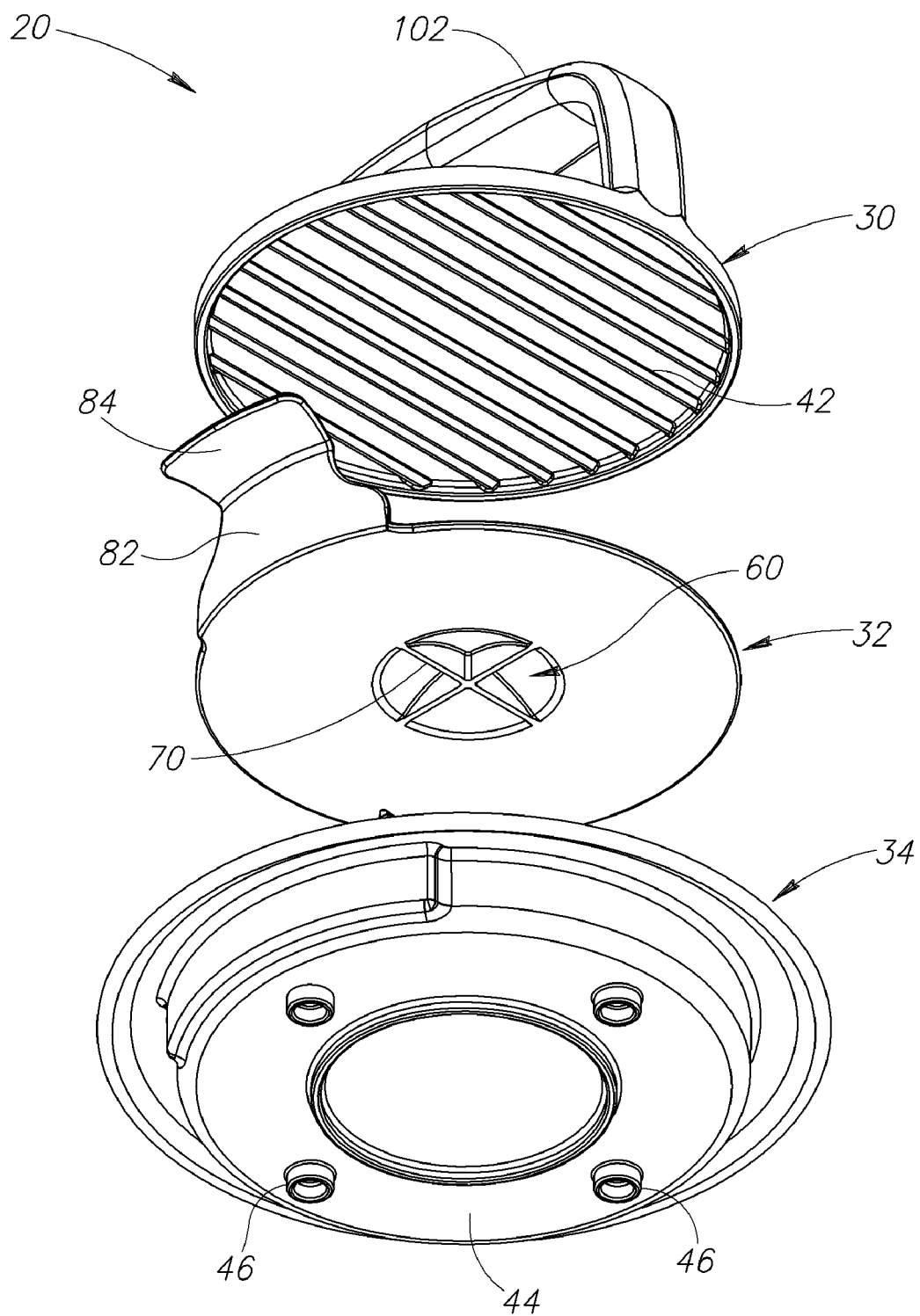
FIG. 2 is a bottom exploded perspective view of the burger press shown in FIG. 1.

A preferred burger press 20 formed in accordance with an embodiment of the present invention overcomes existing deficiencies by creating a burger that is shaped for improved cooking. As shown in FIGS. 1 and 2 below, the burger press 20 includes a plunger 30, a lifter 32, and a base 34.

FIG. 1 is a top exploded perspective view and FIG. 2 is a bottom exploded perspective view of the burger press 20. The base 34 includes an interior region 36 defining a substantially cylindrical shape, although no particular shape is required in accordance with the invention. In a preferred example, the base 34 includes an interior floor 38 and upward extending sidewalls 40, with the floor 38 having a plurality of raised ribs 42 extending laterally across the floor 38. A bottom exterior surface 44 of the base 34 includes several feet 46 that are preferably formed from silicone or other resilient materials that provide for a non-skid surface. In one example the base 34, lifter 32, and plunger 30 are each formed from ABS and include thermoplastic elastomer (TPE) overmoldings as discussed below. In other examples they may be formed from other plastics, metal, ceramics, or other suitable materials.

The lifter 32 includes a main body 48 that is substantially planar, with a peripheral edge 50 that is sized to fit relatively snugly within the base 34. In the version as shown, the main body 48 of the lifter 32 is circular in shape as viewed from the top. In other version when non-circular burgers are desired, the lifter 32 and base 34 may be square or have other shapes.

A central portion 52 of the main body 48 of the lifter 32 includes a raised portion 54 that is shaped as a dome. Though preferably in the form of a rounded convex dome, the raised portion 54 need not have a circumference that matches that of the base peripheral edge. The rounded and smooth dome is preferred and helps to facilitate easier separation of the meat from the lifter 32. As shown, the raised portion 54 occupies the center of the main lifter body and has a diameter that is approximately one third of the diameter of the main lifter body.

A lower surface 60 of the raised dome is hollow and includes one or more structural supports 70 to prevent the raised central portion 54 from collapsing under pressure from the plunger 30. In the example as shown, the structural supports 70 include a pair of vertical supports 72 bisecting the center of the raised portion 54. In other examples, the raised portion 54 may be solid, rather than hollow, or the main body may be formed from materials and at a thickness that renders a support structure unnecessary.

The lifter 32 includes a handle 80 to facilitate removal of the lifter 32 with a formed burger from the base 34. In the preferred example, the handle 80 has a flat upwardly extending arm 82 terminating in a radially projecting tab 84. The arm 82 is configured to abut the inner sidewalls 40 of the base 34 and is flat so that it does not distort the shape of the formed burger.

The base 34 optionally has a peripheral flange 88 and an upper lip 90 extending around the perimeter and upward from the sidewalls 40. The lip 90 separates to form a channel 92 that receives the handle tab 84 from the lifter 32. Likewise, the base 34 optionally includes a recessed region 94 along the sidewalls 40 that mates with the outline of the arm 82. In a preferred form, the arm 82 is received within the recessed region 94 a sufficient amount such that the arm 82 becomes flush with the sidewalls 40 surrounding it.

The plunger 30 includes a generally planar plate 100 that is sized and shaped to fit within the base 34 in order to press the meat against the lifter 32. A handle 102 spans across opposing edges of the plate 100 so that the plunger 30 may be gripped and urged downward. The handle 102 may optionally include TPE overmolding or may be otherwise coated to improve the grip. Other handle arrangements are also possible, such as a knob or other grip that is more centrally mounted to the plate 100.

The lower face of the plate 100 may be smooth or, alternatively, include a plurality of ribs 110 as shown.

In use, the lifter 32 is placed in the base of the press 20, with the handle tab 84 being received within the channel 92 formed by the lip 90. A desired volume of meat (or other shapeable food item) is placed within the base 34, on top the lifter 32. The plunger 30 is then placed on top the meat and pressed downward. Once the meat has been fully pressed, the plunger 30 is raised and the burger is removed by lifting the lifter 32. The lifter 32 can be used to carry the burger to a plate, pan, or grill, as desired.

Figure 3:
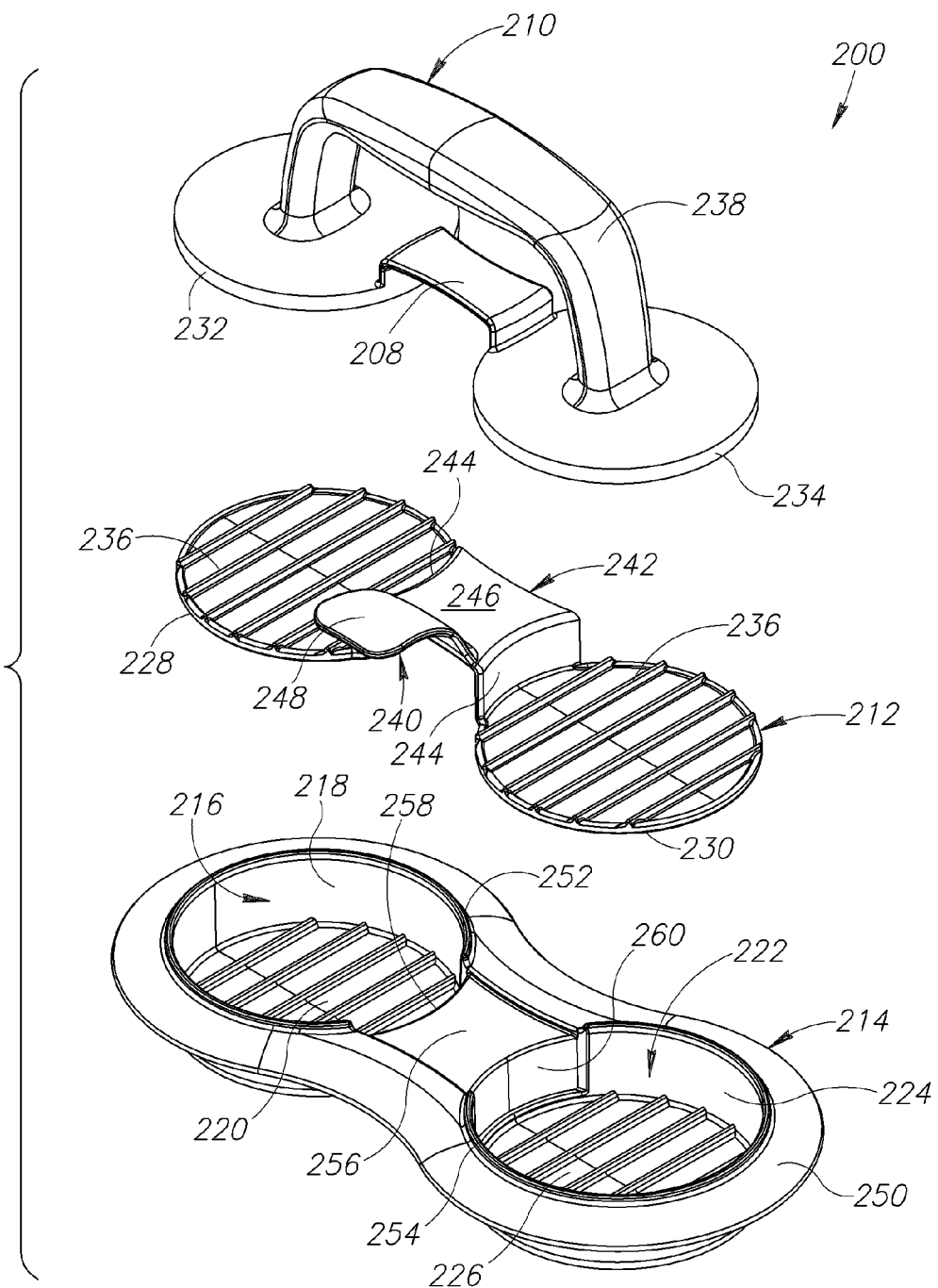
FIG. 3 is a perspective exploded view of a side-by-side double burger press, including a plunger and lifter formed in accordance with an alternative embodiment of the invention.

FIG. 3 shows a side-by-side double burger press 200 formed in accordance with an alternative embodiment of the invention. In similar fashion to the burger press 20 shown in FIGS. 1-2, the burger press 200 also includes a plunger 210, a lifter 212, and a base 214. The base 214 defines a first recessed portion 216 with upward extending sidewalls 218 and a floor 220. The base also defines a second recessed portion 222 with upward extending sidewalls 224 and a floor 226. The lifter 212 includes a first lifting plate 228 sized and shaped to fit within the first recessed portion 216 of the base 214. The lifter 212 also includes a second lifting plate 230 sized and shaped to fit within the second recessed portion 222 of the base 214. The plunger 210 includes a first generally planar plate 232 sized and shaped to fit within the first recessed portion 216 of the base 214. The plunger 210 also includes a second generally planar plate 234 sized and shaped to fit within the second recessed portion 222 of the base 214. In the embodiment shown, the first lifting plate 228 and the second lifting plate 230 include a plurality of linear ribs 236 that extend laterally across a top surface of the first lifting plate 228 and the second lifting plate 230, respectively.

An arched brace 208 joins the first substantially planar plate of the plunger to the second substantially planar plate of the plunger. The arched brace is configured to span the saddle 242 described below. Preferably, the arched brace has a lower surface that matches the contour of the upper surface of the saddle 242, though in other versions of the invention it has a greater arch, leaving space between the arch and the saddle.

The plunger 210 includes a handle 238 that spans between the first plunger plate 232 and the second plunger plate 234. The lifter 212 includes a handle 240 to facilitate removal of the lifter 212 with two formed burgers from the base 214. In the example shown, the handle 240 has a saddle portion 242 that connects the first lifting plate 228 and the second lifting plate 230. The saddle portion 242 includes two upwardly extending surfaces 244 connected by a third surface 246. An arm 248 extends upwardly and radially outward from an edge of the third surface 246.

The base 214 optionally has a peripheral flange 250, a first upper lip 252 around a perimeter of the first recessed portion 216 and upward from the sidewalls 218, and a second upper lip 254 around a perimeter of the second recessed portion 222 and upward from the sidewalls 224. The first lip 252 and the second lip 254 separate to form a channel 256 that receives the saddle portion 242 of the lifter 212. Likewise, the base 214 optionally includes a first recessed region 258 along the sidewalls 218 that mates with the outline of one of the upwardly extending surfaces 244, and a second recessed region 260 along the sidewalls 224 that mates with the outline of the other of the upwardly extending surfaces 244. In a preferred form, the upwardly extending surfaces 244 are received within the recessed regions 258, 260 a sufficient amount such that the upwardly extending surfaces 244 become flush with the sidewalls 218, 224, respectively, surrounding them. A bottom exterior surface 262 of the base 214 includes several feet 264 that are preferably formed from silicone or other resilient materials that provide for a non-skid surface.

Figure 4:
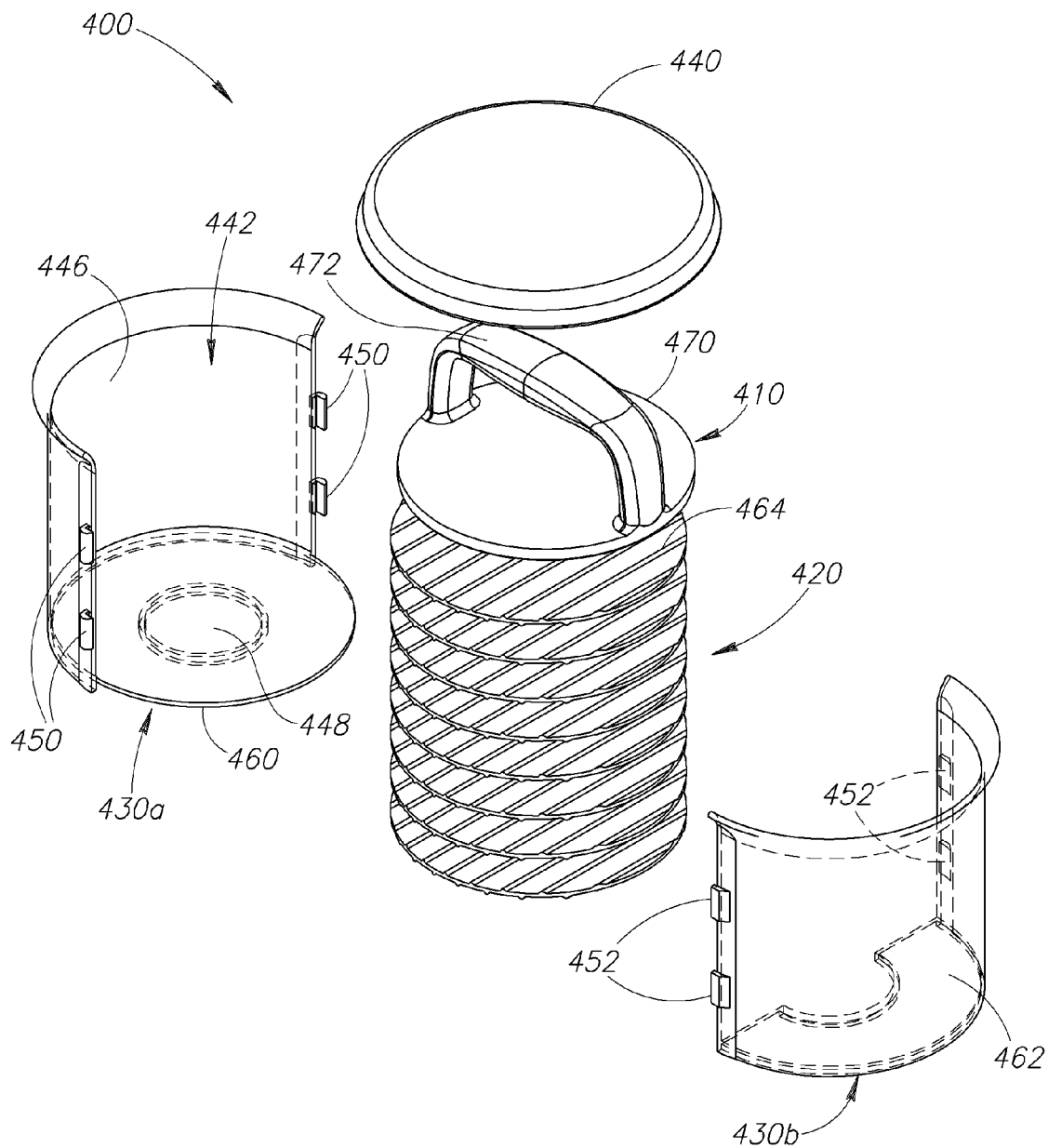
FIG. 4 is a perspective partial x-ray exploded view of a multiple burger press formed in accordance with an additional embodiment of the invention.
Figure 5:
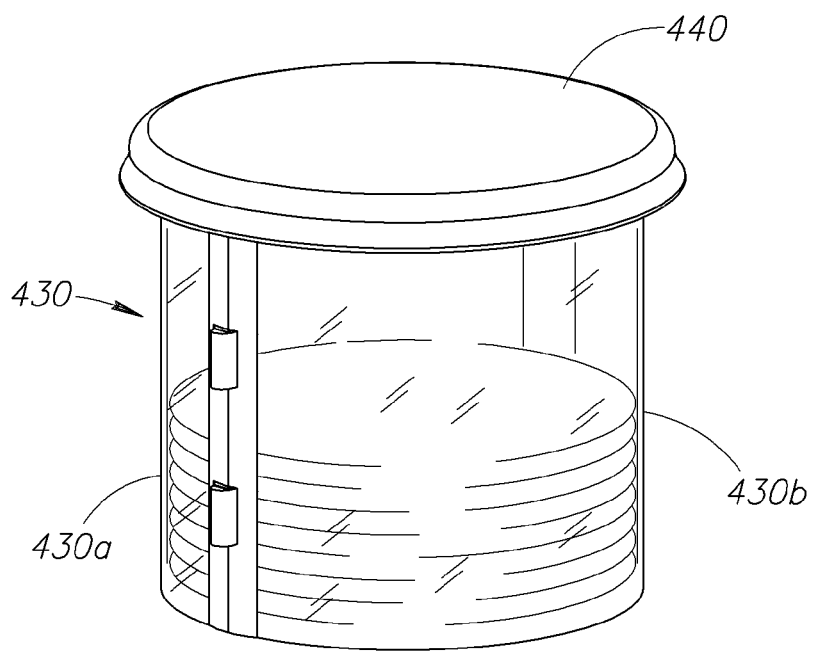
FIG. 5 is a perspective view of the multiple burger press shown in FIG. 4 with a lid attached to the canister base.
Figure 6:
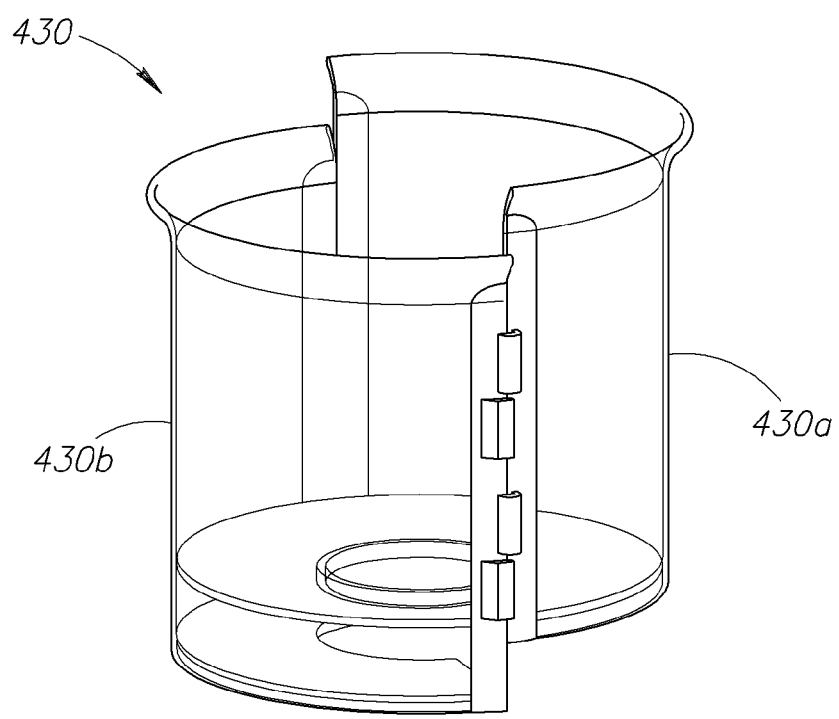
FIG. 6 is a perspective view of the first half and second half of the canister shown in a partially attached state.

FIGS. 4-6 show a multiple burger press 400 formed in accordance with an additional embodiment of the present invention that is designed to allow multiple burgers to be formed in a single press, then be stored and transported in the press itself. As shown in the illustrations below, the burger press 400 includes a plunger 410, a lifter in the form of a separating disk 420, a base in the form of a canister 430, and a lid 440.

The canister 430 includes an interior region 442 defining a substantially cylindrical shape, although no particular shape is required in accordance with the invention. In some examples of the invention, the canister 430 may be square or have other shapes. In such a version, the lid 440, disks 420, and plunger 410 are preferably of the same peripheral shape.

In a preferred example, the canister 430 includes an interior floor 460 and upward extending sidewalls 446, with the floor 460 having a raised central portion 448 as described further below.

The canister 430 may be formed as a solitary, integral cylinder. In a version as illustrated below, the canister 430 is formed in two halves so that it may be opened for more convenient access to the pressed burgers and for better cleaning. Thus, as shown the canister 430 is divided into a first half 430a and a second half 430b. The first half 430a includes one or more fasteners 450 that mate with corresponding fasteners 452 on the second half. For example, each of the two halves 430a, 430b may include complementary tabs and slots, snaps, separable hinges, or the like to removably secure the halves together. Alternatively the two halves 430a, 430b may be more permanently connected via hinges that allow the halves to pivot open but remain joined.

In an example embodiment, one half of the canister 430 includes a floor 460 that is sized and configured to cover all or substantially all of the bottom surface of the interior of the canister 430. The other half of the canister 430 may have no floor section at all, may also have a floor that covers substantially all of the bottom surface of the canister 430, or, as shown, may have a floor section 462 that covers only a portion of the bottom of the canister 430.

In the illustrated version, the canister 430 forms a cylinder and the bottom surface of the canister 430 is circular in shape. Thus, the bottom section of the first half 430a of the canister 430 is circular in shape and generally matches the size of the cross section of the canister 430. A central portion of the floor 460 includes raised circular flange 448. The bottom section of the second half 430b of the canister is arc shaped and is formed as a semi-circle having a removed portion that mates with the edge of the raised circular flange 448. Thus, when the two halves 430a, 430b of the canister 430 are joined together, the floor 462 of the second section 430b rests on top of the floor 460 of the first section 430a to provide a relatively airtight seal.

The disk 420 includes a main body that is substantially planar, with a plurality of ribs 464 (not all are numbered for clarity) extending across the surface of the disk. Preferably, the ribs 464 are provided on both the top and bottom surfaces of the disk 420. In the version as shown, the main body of the disk 420 is circular in shape as viewed from the top. In other version when non-circular burgers are desired, the lifter disk 420 and base may be square or have other shapes.

Any number of disks 420 may be used with the press 400 as shown. Preferably there are at least four disks 420 and more preferably there are at least eight disks 420. Accordingly, the canister 430 has a height that is sufficiently tall to allow for a corresponding number of burgers and disks 420 to be contained within the canister 430. In a version having eight disks 420, the height of the canister 430 will be eight times the thickness of the disk 420 and burgers pressed between each disk 420.

The plunger 410 includes a generally planar plate 470 that is sized and shaped to fit within the canister 430 in order to press the meat against the disk 420. A handle 472 spans across opposing edges of the plate so that the plunger 410 may be gripped and urged downward. The handle 472 may optionally include TPE overmolding or may be otherwise coated to improve the grip. Other handle arrangements are also possible, such as a knob or other grip that is more centrally mounted to the plate 470. The lower face of the plate 470 may be smooth or, alternatively, include a plurality of ribs 464 as shown.

The lid 440 is configured to fit over a top rim of the canister 430 in order to seal the canister 430 and the burgers within it. In one example, the lid has 440 a circular cross section and includes a downward-extending flange that fits around the outer perimeter of the rim.

In use, a disk 420 is placed on the floor of the canister 430. A desired volume of meat (or other shapeable food item) is placed within the canister 430, on top the disk 420. The plunger 410 is then placed on top the meat and pressed downward. Once the meat has been fully pressed, the plunger 410 is raised and another disk 420 is placed on top of the pressed meat created by the plunger 410. This process is repeated as many times as is desired, by inserting another disk 420 and pressing meat into successive layers.

When the canister 430 is filled with a desired number of layers of burgers separated by disks 420, the canister 430 can be opened in order to remove the burgers for cooking. If the canister 430 is a unitary cylinder, the cylinder may be turned upside-down to remove them. Likewise, in the event the burgers are to be stored for cooking later, the lid 440 may be placed atop the rim of the canister 430 so that it may be stored in the refrigerator or freezer until ready for cooking.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A burger press comprising:
   a base forming a lower perimeter and having sidewalls extending upwardly from the lower perimeter;
   a lifter having a lifter perimeter sized and shaped to removably fit snugly within the lower perimeter of the base, the lifter further having a lifter handle comprising an upwardly extending arm, the arm being positioned snugly against one of the sidewalls when the lifter is positioned within the base; and
   a plunger having a handle attached to a first side of a generally planar plate that is sized and shaped to fit within the base,
   wherein at least one of a second side of the plunger plate and the lifter are shaped to include a surface feature selected from a plurality of ribs and a raised portion, the plurality of ribs and the raised portion being structured to press into a burger as the burger is formed in the burger press by compressing the burger between the plunger and the lifter.

2. The burger press of claim 1, wherein the second side of the plunger plate includes a plurality of linear ribs that extend laterally across the plunger plate.

3. The burger press of claim 1, wherein the lifter includes a convex dome-shaped raised central portion.

4. The burger press of claim 3, wherein the lifter includes a circular main lifter body and wherein the dome-shaped raised central portion is approximately one third of the diameter of the main lifter body.

5. The burger press of claim 1, wherein the lifter handle further comprises a lateral tab attached to the arm and extending radially away from the arm.

6. The burger press of claim 5, wherein the base further comprises: a peripheral flange; and an upper lip extending around a perimeter of the base and upward from the sidewalls, wherein the upper lip defines a channel structured to receive the radially projecting tab of the lifter handle.

7. The burger press of claim 5, wherein the base defines a recessed region along the sidewalls, the recessed region structured to receive the upwardly extending arm of the lifter handle.

8. The burger press of claim 1, wherein the second side of the plunger plate includes a plurality of linear ribs that extend laterally across the plunger plate, wherein the lifter includes a convex dome-shaped raised central portion, and wherein the lifter handle further comprises a flat upwardly extending arm terminating in a radially projecting tab.

9. The burger press of claim 1, wherein the base defines a first recessed portion with upward extending sidewalls and a second recessed portion with upward extending sidewalls, wherein the lifter includes a first lifting plate sized and shaped to fit within the first recessed portion of the base and a second lifting plate sized and shaped to fit within the second recessed portion of the base, and wherein the plunger includes a first generally planar plate sized and shaped to fit within the first recessed portion of the base and a second generally planar plate sized and shaped to fit within the second recessed portion of the base.

10. The burger press of claim 9, wherein the first lifting plate is secured to the second lifting plate by a saddle portion extending between the first lifting plate and the second lifting plate.

11. The burger press of claim 1, further comprising a plurality of additional lifters, and wherein the sidewalls of the base are sufficiently tall to allow for the plurality of lifters to be contained within the base together with a number of burgers corresponding to the total number of the plurality of lifters contained within the base at the same time.

12. The burger press of claim 11, wherein the base comprises a first half and a second half, the first half being removably secured to the second half.

13. The burger press of claim 12, wherein the sidewalls terminate in a rim, the burger press further having a lid removably secured to the rim.

14. A burger press comprising:
a closed base having upward extending sidewalls, the base forming a first half and a second half hingedly secured to the first half, wherein the base is configured without openings when the first half is hinged against the second half, the sidewalls further terminating in an upper rim defining an open top;
a lid removably secured to enclose the open top;
a plurality of disks sized and shaped to fit within the base; and
a plunger having a handle attached to a first side of a generally planar plate that is sized and shaped to fit within the base,
wherein at least one side of each disk is shaped to include a surface feature selected from a plurality of ribs and a raised portion, the plurality of ribs and the raised portion being structured to press into a burger as the burger is formed in the burger press, and wherein the base is sufficiently tall to allow for each disk to be contained within the base plus a number of burgers corresponding to the total number of disks to be contained within the base at the same time.

15. The burger press of claim 14, wherein the base comprises a first half and a second half, wherein the first half includes a fastener that mates with a corresponding fastener on the second half.

16. The burger press of claim 15, wherein the base includes an interior floor, the floor having a raised central portion.

17. The burger press of claim 14, wherein the plurality of disks includes at least four disks.

18. The burger press of claim 14, wherein the plurality of disks includes at least eight disks, wherein each disk includes a plurality of ribs extending laterally across both a first side and a second side of the disk.

* * * * *